(12) United States Patent
Kumar

(10) Patent No.: US 10,120,936 B2
(45) Date of Patent: Nov. 6, 2018

(54) PROVIDING SYSTEM CONFIGURATION INFORMATION TO A SEARCH ENGINE

(75) Inventor: Amit Kumar, San Jose, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 1454 days.

(21) Appl. No.: 11/642,177

(22) Filed: Dec. 19, 2006

(65) Prior Publication Data

US 2008/0147617 A1   Jun. 19, 2008

(51) Int. Cl.
*G06F 15/173* (2006.01)
*G06F 17/30* (2006.01)
*H04L 29/08* (2006.01)

(52) U.S. Cl.
CPC ........ *G06F 17/30864* (2013.01); *H04L 67/02* (2013.01)

(58) Field of Classification Search
USPC .................................. 709/220–223; 707/200
See application file for complete search history.

(56) References Cited

U.S. PATENT DOCUMENTS

| | | | |
|---|---|---|---|
| 6,138,113 A * | 10/2000 | Dean et al. | |
| 6,418,453 B1 * | 7/2002 | Kraft et al. | 707/200 |
| 6,463,455 B1 * | 10/2002 | Turner et al. | 709/200 |
| 6,487,555 B1 * | 11/2002 | Bharat et al. | |
| 7,137,065 B1 * | 11/2006 | Huang et al. | 715/205 |
| 7,181,454 B1 * | 2/2007 | McClamroch | G06F 8/71 |
| 7,886,032 B1 * | 2/2011 | Louz-On | G06F 17/30864 709/217 |
| 7,886,217 B1 * | 2/2011 | Henzinger | G06F 17/3089 715/205 |
| 2003/0028896 A1 * | 2/2003 | Swart | H04N 7/17318 725/127 |
| 2003/0187921 A1 * | 10/2003 | Diec | 709/203 |
| 2006/0294199 A1 * | 12/2006 | Bertholf | G06F 17/30893 709/217 |
| 2007/0005564 A1 * | 1/2007 | Zehner | G06F 17/30592 |
| 2007/0050338 A1 * | 3/2007 | Strohm | G06F 17/30864 |
| 2007/0300152 A1 * | 12/2007 | Baugher | G06F 17/3089 715/210 |
| 2008/0183720 A1 * | 7/2008 | Brown et al. | 707/10 |

FOREIGN PATENT DOCUMENTS

WO   WO 03/042874   * 11/2002 ............. G06F 17/30

* cited by examiner

*Primary Examiner* — Scott B Christensen
(74) *Attorney, Agent, or Firm* — Hickman Palermo; Becker Bingham LLP

(57) ABSTRACT

Providing a search engine with system configuration information. The system configuration information pertains to a system having a web server that provides content. For example, the content may be web pages associated with a web site, and the system may include hardware and software used to provide the content of the web site to end users. More particularly, the system can include one or more computer systems, web server software, application server software, and application programs that facilitate providing content. A search engine requests system configuration information from the web server. In response to the request, the web server provides system configuration information to the search engine. The search engine can use the system configuration information to reference portions of the content in an index. The index can be used to respond to a search query that involves content served by the web server.

29 Claims, 4 Drawing Sheets

PROVIDING SYSTEM CONFIGURATION INFORMATION TO A SEARCH ENGINE

FIELD OF THE INVENTION

The present invention relates to computer systems, and more particularly to providing a search engine with system configuration information to facilitate indexing content associated with the system.

BACKGROUND

As is well-known, search engines return search results that match a search query submitted by a user. The corpus of documents that search engines search can be extraordinarily large, and in some cases, almost unbounded. For example, some search engines search, or at least attempt to search, the entire "World Wide Web." To facilitate the search, search engines typically build an index of the content of the corpus. The content may contain web pages, and the search engine may add Uniform Resource Identifiers (URLs) of the web pages to the index. However, due to the nature of the World Wide Web, the search engine must first locate a web page in order to add a reference to the web page to the index.

One common technique to locate web pages is to "crawl the web." Crawling the web means to start with one web page, and follow "hyperlinks" in that web page to discover other web pages. The starting web page might have been provided to the search engine as a web page of interest. For example, the provider of content associated with the web page might provide the search engine with a URL of the web page such that the search engine will, hopefully, include that web page, and also those that it links to, in the index.

However, relying only on crawling the web to discover web pages has limitations. For example, some web pages might never be discovered. Further, content of web pages is subject to change; therefore, web pages should be re-indexed at some point in time. A possible solution to this problem is for the content provider to provide the search engine with a list of URLs rather than a single URL. The content provider might also provide the search engine with information about a particular web page itself, such as how frequently the content on the web page changes. Such information could benefit the search engine in that it would know how often it should re-examine the content of the web page to update the index.

Another technique that may be used by some search engines is to apply algorithms to discover additional information about the content of the web pages. For example, some web pages might be identified by multiple URLs. It would not benefit a user to provide the user with search results identifying all the URLs, as that would, in effect, be providing the user with redundant web pages. If the search engine can discover, through analysis of the content of two web pages, that they are substantially identical, the search engine can discard one web page. As another example, a web page is often divided into a region with content of interest to a search, such as a news article, and content that may not be of interest, such as an ad banner. The search engine could provide better search results if the search engine ignores the ad banner portion of the web page. Thus, the search engine might algorithmically predict which portions of the web page are of interest to a search.

However, a problem with the search engine applying algorithms to attempt to learn more information about the content of web pages is that the algorithms may fail to correctly characterize the content of the web pages. For example, the web page might be constructed such that it is difficult to determine what portion is not relevant to a search. Moreover, applying algorithms may be limited to the content on the web page itself.

Therefore, limitations exist with respect to how well a search engine can provide search results due to the limited amount and accuracy of information that search engines have with respect to the content in the corpus to be searched.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
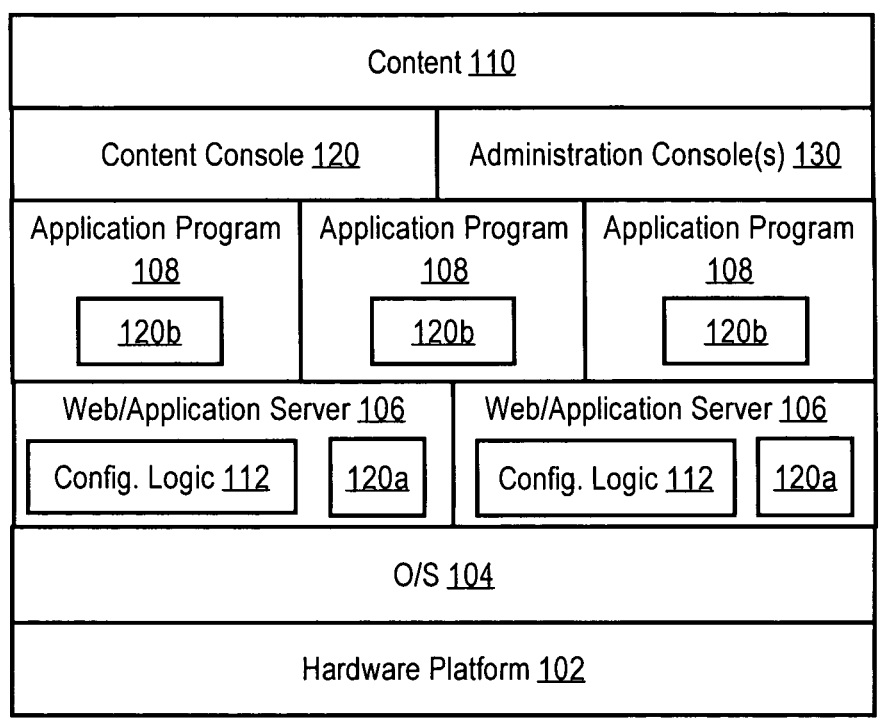
FIG. 1 is an example host machine for providing system configuration information to a search engine, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed herein to provide a search engine with system configuration information. The system configuration information pertains to a system having one or more web servers that provide content. For example, the content may be web pages associated with a web site, and the system may include hardware and software used to provide the content of the web site to end users. More particularly, the system can include one or more computer systems, web server software, application server software, and application programs that facilitate providing content. An example of an application program to facilitate providing content is a program that is used to develop "blog" web pages. The system configuration information might pertain to any of the aforementioned system components. The search engine might use the system configuration information to index content, such as web pages, that is provided by the system.

The following steps are performed, in accordance with one embodiment. A search engine requests system configuration information from a web server. In response to the request, the web server provides system configuration information to the search engine. The search engine can use the system configuration information to help determine how to reference portions of the content in an index. The index can be used to respond to a search query that involves content served by the web server.

The following example is provided to illustrate one possible use of system configuration information to index content associated with the system. A particular web site might have different configurations for web pages in different sections of the web site. More particularity, blog web pages might be configured differently than news web pages. The system configuration information may describe the configuration of each type of web page, as well as what section of the web site the web pages may be found. The section of the web site might be identified by the leading portion of the URL. The search engine can make use of this information when indexing the web pages. For example, the search engine might add, to the index, keywords extracted from a first portion of a blog web page and ignore another portion. Thus, when responding to a search query, the web page is only returned if search terms match keywords in the first portion of the blog web page. Many other examples are provided herein of providing system configuration information to a search engine such that the search engine is able to reference, in an index, content associated with the system.

Example Host Machine for Providing System Configuration Information to Search Engine FIG. 1 is an example host machine 100 for providing system configuration information 120, in accordance with an embodiment of the present invention. The host machine 100 has one or more web servers 106 executing thereon. The web servers 106 serve content 110 to clients. A web server 106 may include an application server to facilitate accessing the various application programs 108. The host machine 100 is one of possibly many host machines 100 that provide the infrastructure (e.g., hardware and software) to implement a web site. As used herein, the term "web site" refers to a collection of web pages or other documents. Thus, the content 110 may comprise one or more web pages. However, the content 110 is not limited to web pages.

As used herein, the term "web server" refers to a software process, which runs on a host machine 100. In one embodiment, the web servers 106 deliver the content 110 to clients in accordance with an HTTP protocol. One or more web servers 106 may run on a single host machine 100. An example of a web server 106 is an Apache Web Server, which is provided by the Apache software foundation. Another example of a web server 106 is the Sun Java System Web Server, which is commercially available from SUN Microsystems of Santa Clara, Calif.

The term web server 106, as used throughout this description, includes "web proxy servers." A web proxy server is a web server 106 that provides indirect access to content 110. For example, if a web server 106 is functioning as a web proxy server, it might provide content 110 to a client by accessing content 110 from another host machine 100. Once accessed, the web server 106 might cache the content 110, wherein the cached content may be provided to satisfy future client requests. An example of a web proxy server is the Java System Web Proxy Server, which is commercially available from Sun Microsystems.

The example host machine 100 has application programs 108 that facilitate providing the content 110. An example of an application program 108 is a blog program that allows blog entries to be developed. Another example of an application program 108 is an e-commerce program that allows an e-commerce portion of a web site to be developed and maintained.

The example host machine 100 has a content console 120 for submitting content 110 to the host machine 100. This allows a content publisher to provide the content of web pages, for example. The example host machine 100 has an administration console 120, which may be used for providing configuration information to the host machine 100. As an example, a content publisher might provide a template for web pages. Once the host machine 100 has the content, and optionally a template for the web page, software (e.g., web server 106 and/or application program 108) on the host machine 100 formats the content 110 into web pages.

The system configuration information 120 pertains to any of the hardware or software associated with the host machine 100. In this embodiment, the web servers 106 have configuration logic 112 that is used to provide web server configuration information 120*a* to a client, such as a search engine. In this embodiment, the application programs 108 have application configuration information 120*b*, which may be stored in a file. In one embodiment, the configuration logic 112 in a web server 106 obtains the application configuration information 120*b* and forwards it on to the client. However, an application program 108 or another component of the host machine 100 may also have logic that provides system configuration information 120 to a client.

The example host machine 100 has a hardware platform 102 on which various software processes run. Examples of hardware platforms 102 are a Sun Fire™ server and a Sun Blade™ Modular System, which are commercially available from SUN Microsystems of Santa Clara, Calif. The hardware platform 102 has an operating system 104 executing thereon. Examples of operating systems include a Solaris™ Operating System, Linux™ Operating System, and Microsoft™ Operating System. The system configuration information 120 may pertain to the operating system 104 and/or the hardware platform 102.

Overview of System that Provides Configuration Information and Search Engine

Figure 2:
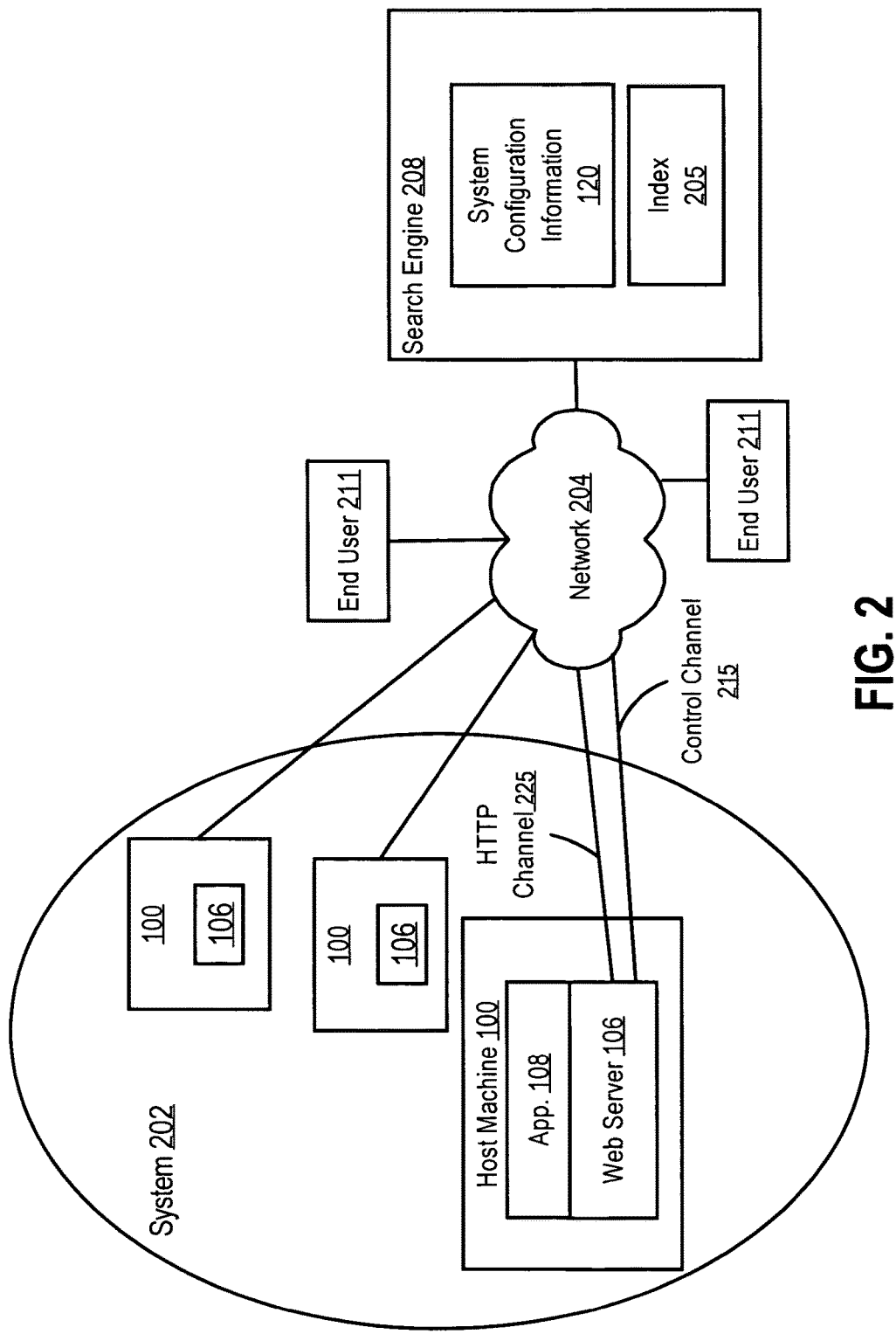
FIG. 2 is an example system that provides system configuration information to a search engine, in accordance with an embodiment of the present invention.

FIG. 2 illustrates a system 202 that provides system configuration information 120 to a search engine 208, in accordance with an embodiment of the present invention. The system configuration information 120 may include configuration information pertaining to any hardware or software in the system 202 that is used to facilitate providing content 110 provided by the system 202.

The system 202 has several host machines 100, each of which may be running one or more web servers 106. The host machines 100 may reside in vastly different physical locations. For example, host machines 100 may be on different continents. The system 202 has content 110 associated with it that is provided to clients, such as end user 211 and search engine 208. The end user 211 may be a personal computer running a web browser. The content 110 associated with the system 202 may be web pages, or other documents, that collectively form a web site.

The web server 106 has an HTTP channel 225, which it uses to communicate with end users 311 and the search engine 208. For example, the web server 106 transfers web pages on the HTTP channel 225 to clients in accordance with an HTTP protocol. Furthermore, the system configuration information 120 may be transferred to the search engine 208 on the HTTP channel 225, as will be discussed more fully below. A web server 106 may also have a control channel 215, which it may use to communicate system configuration information 120 to the search engine 208, as discussed more fully below.

The search engine 208 is communicatively coupled to one or more web servers 106 via network 204. Thus, the search engine 208 is able to crawl the web site associated with system 202 to add references to web pages to the index 205. The search engine 208 applies the system configuration information 120 to reference the web pages in the index 205, in one embodiment.

Network 204 may be the Internet, although this is not required. The search engine 208 is able to perform a search of the World Wide Web, in one embodiment.

Process Flow for Proving System Configuration Information 120 to Search Engine

Figure 3:
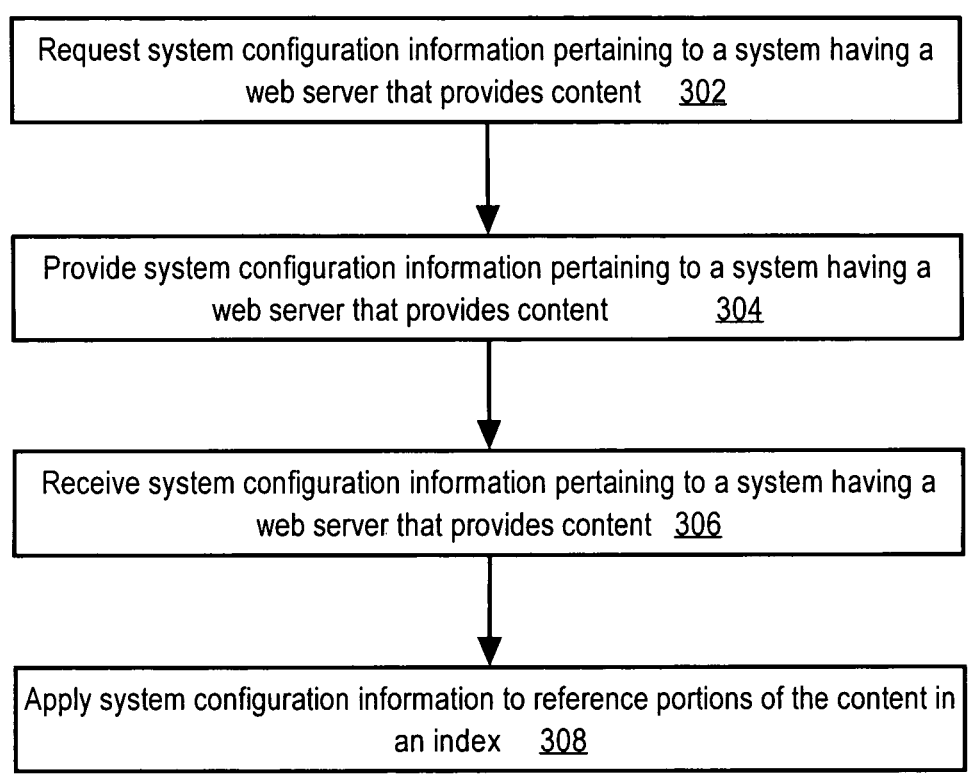
FIG. 3 is a flowchart illustrating a process for providing system configuration information to a search engine, in accordance with an embodiment of the present invention.

FIG. 3 is a flowchart illustrating a process 300 for requesting and applying system configuration information 120, in accordance with an embodiment of the present invention. Process 300 will be discussed in connection with the example host machine 100 of FIG. 1 and the example system 202 of FIG. 2, although process 300 is not so limited. In step 302, the search engine 208 sends a request to a web server 106 for system configuration information 120 pertaining to a system 202 that includes the web server 106.

In step 304, the web server 106 provides the system configuration information 120 to the search engine 208. Several example protocols are discussed below for how the web server 106 might provide the system configuration information 120 to the search engine 208. However, process 300 is not limited to the example protocols. In step 306, the search engine 208 receives and stores the system configuration information 120.

In step 308, the search engine 208 applies the system configuration information 120 to reference portions of the content 110 in an index. For example, the system configuration information 120 could be applied when the search engine 208 crawls the web site associated with the system 202 to build the index 205. As a particular example, web pages from the system 202 are referenced in the index 205.

Example Protocols for Providing System Configuration Information

The system configuration information 120 can be transferred to the search engine 208 in a variety of ways. The following example protocols are for illustration and are not exhaustive. Note that some types of system configuration information 120 may be more suitable to transfer with one protocol than another.

Control Channel

In one embodiment, the web server 106 and the search engine 208 establish a control channel 215 on which the web server 106 provides the search engine 208 the system configuration information 120. When the search engine 208 contacts the web server 106 associated with a particular web site, the search engine 208 identifies itself to the web server 106 and indicates that it wishes to obtain system configuration information 120. The web server 106 may inform the search engine 208 that the web server 106 has another port on which the search engine 208 may connect. As an example, the web server 106 tells the search engine 208 that it supports the other port by including information in the HTTP headers of the response that is sent on the HTTP channel 225. The control channel 215 allows communication by means other than a web browser, which may speed up the communication process. For example, the search engine 208 and web server 106 do not need to communicate with the normal web browser request/response mechanism when using the control channel 215.

Web Crawling Robots (Spiders)

The web server 106 may have a directive file that defines information such as where a spider is permitted to crawl. For example, the directive file tells the spider not to even attempt to crawl a particular directory because that directory is behind a login wall, such that the spider cannot get the content anyway. In one embodiment, the system configuration information 120 is used to automatically update the directive files.

HTTP Headers

In one embodiment, the web server 106 adds system configuration information 120 in HTTP headers. For example, when returning a web page to the search engine 208, the web server 106 adds system configuration information 120 to the HTTP headers of the HTTP response. The system configuration information 120 could be relevant to the particular web page sent in the response, a section of the web site of which the web page is a part, or the entire system 202.

Structured Document

Rather than returning a normal HTML document, the web server 106 may return a document in a format that is easier for the search engine 208 to consume. For example, instead of returning an HTML document for a web page, the web server 106 returns the same web page in XML format. This technique may be suitable for conveying some system configuration information 120, such as the template of a web page, although not necessarily all types of configuration information 120 is transferred with this technique.

Example System Configuration Information

For the purposes of illustration the following examples of system configuration information 120 are provided. The examples of system configuration information 120 are divided into web server configuration information and application program information for purposes of illustration. The system configuration information 120 can pertain to other than web server and application program.

Web Server Configuration Information

Preferred Canonical URL

One type of system configuration information 120 is a preferred canonical form of a URL for a particular web page, as stated by the web server 106. The particular web page may be accessible by multiple URLs. However, one of the URLs may be preferred for one or more reasons. Without this preferred canonical URL, the search engine 208 could apply an algorithm to predict a preferred URL, such as predicting that the shortest URL is the preferred URL. However, this prediction may be inaccurate. Therefore, by knowing the preferred URL, as provided by the web server 106, the search engine 208 can leave other URLs out of the index 205, or mark those URLs in the index 205 in a way to indicate that those URLs are not preferred. Thus, the search engine 208 may be able to return better search results by using the preferred form of the URL in the search results.

Other URL Information

Other URL information such as whether URLs are case sensitive may be included in the system configuration information 120. In the event that the case sensitivity of URLs change for a particular web site, or portion thereof, the time at which the change in this configuration occurred can be provided to the search engine.

Directory or Section-level Information

Often a web site is divided into different sections, such as a blog section, an e-commerce section, etc. The different sections are sometimes demarcated by a directory structure. For example, a blog area might have a URL that starts "acme.com/blog," whereas a sales section might have a URL that starts "acme.com/sales." The search engine 208 may benefit from having system configuration information 120 that is specific to a particular section. Therefore, such directory or section level information may be included in the system configuration information 120.

Session Information

The system configuration information 120 may include information related to session tracking. By providing the search engine 208 with session tracking information used by the system 202, the search engine 208 is better able to crawl the web site when building the index 205. Examples of session tracking information include, but are not limited to, URL parameters and session cookies.

URL parameters are information added to a URL to help track sessions. For example, a system 202 managing an e-commerce web site might add a URL parameter to the URL with the parameter staying with the URL as the user migrates from one web page to the next to track the user's session. Note that if a first user were to obtain a URL with a URL parameter identifying the session for another user, then the session information is not valid for the first user.

It is possible that a search engine 208 might obtain a URL that has a URL parameter. For example, if a user embedded a URL that has a session tracking URL parameter into a particular web page, then the search engine 208, when crawling that particular web page, should not attempt to use the URL with the session tracking URL parameter. If the web server 106 informs the search engine 208 what the URL parameter looks like, the search engine 208 can avoid using that URL, or at least re-format the URL by removing the session tracking URL parameter.

Cookies may also be used for session tracking. For example, a web server 106 may send a session cookie to a client web browser to track a session. The session cookie has a name and a session identifier. The web server 106 provides the search engine 208 with the name of the cookie, such that the search engine 208 can easily identify the cookie in the future. Once identified, the cookie may simply be ignored by the search engine 208.

Application Identifier

The system configuration information 120 may describe what application program 108 is used on one or more sections of the web site. For example, if a web/application server 106 is running multiple application programs 108 on the same host machine 100, the web/application server 106 could return an Application Identifier in use for a given path in the directory, in order to help the search engine 208 differentiate between the different types of content 110 being served. For example, the application identifier can help the search engine 208 distinguishing an e-commerce section of the web site from a blog section of the web site. Once the search engine 208 knows the application program, the search engine 208 may be able to deduce that different web pages in the section of the web site corresponding to a particular application program have similar properties, such as web page templates.

Hosts Served

The system configuration information 120 may describe what hosts are served by the web server 106. For example, if the same web server 106 might host both a "www" and "non-www" version of a web site, the web server 106 could report this in the system configuration information 120. Thus, the search engine 208 does not have to resort to heuristics or webmaster input to learn this information. Note that the different versions of the web site could have URLs that are very different from each other.

Contact Information

The system configuration information 120 may include contact information for reporting problems with the web server 106. For example, if the search engine 208 is not able to crawl the web site, an administrator of the web site can be contacted.

Error Page Information

The system configuration information 120 may describe how the web server 106 responds to a request when a web page is not found or some other error occurs. For example, if the web server 106 is configured to return an actual web page even when a non-existent web page is requested, the web server 106 could inform the search engine 208 of this fact. Such information could be used by the search engine 208 to improve "soft-404 detection" algorithms used by the search engine 208. A soft-404 error refers to the web server 106 returning a web page even thought the requested web page does not exist.

Duplicate Content Guidance

The system configuration information 120 may provide guidance on duplicate content 110 on the web site. For example, the web server 106 could inform the search engine 208 that the paths "/blog" and "/journal" correspond to the same content 110, and should be treated as duplicate branches.

Spider Information

The system configuration information 120 may include rules that apply to spiders. As previously discussed, a file can tell a spider not to even attempt to crawl a particular directory because that directory is behind a login wall, such that the spider cannot get the content anyway.

Application Program Configuration Information

Templates

The system configuration information 120 may include templates that are applicable to a particular level of a directory. For example, web pages in a blog section of the web site can have a different format from web pages in a shopping section. A web server 106 provides either the templates or the location of the templates to the search engine 208, in one embodiment. The web server 106 obtains the templates from an application program 108, in one embodiment.

In one embodiment, the web server 106 provides this template information by providing a location of a template. For example, the template location is specified in the HTTP headers of an HTTP response to a request for the web page having that template. The following are two examples of how to describe the template location, although there are many other ways of describing a location.

X-Template-Body-Content: /blog/*=>//div[@class=body]

X-Template-Sample: /blog/sample.php

Alternatively, the template could be transferred directly to the search engine 208 in response to a request for the web page. For example, the template could be transferred in the control channel 215, and the web page might be transferred in the HTTP channel 225.

Language

The system configuration information 120 may describe the language used on one or more sections of the web site. Some system 202 manage a web site in such a way as to divide the content 110 into a section presented substantially in a first language, another section in a second language, etc. The search engine 208 may be able to discover the language being used on its own; however, being provided the language of each section can help the search engine 208 when processing web pages to add them to the index 205. The web server 106 provides this information by identifying the language used for a given sub-path of the directory, in one embodiment. The web server 106 obtains the language information from an application program 108, in one embodiment.

Bulk Change Information

The system configuration information 120 may describe bulk changes made to on one or more sections of the web site. For example, an application program 108 can tell a web-crawling robot that formally was at "acme.com/x" is not at "acme.com/y." Other examples of bulk change information are a deletion or addition of an entire section of a web site.

Microformats

The system configuration information 120 may describe what microformats are used in a particular web page. Microformats are ways of annotating a web page to indicate a semantic meaning associated with content 110 on the web page. For example, a microformat can be used to indicate that the term "San Jose" is a city. A microformat could be an elemental microformat, which may be as simple as an attribute attached to an existing attribute. A microformat can also be a compound microformat, which can be an organized collection of data. Examples of compound microformats include hCalendar, hCard, and hReview.

If the search engine 208, or more particularly, a web crawler is aware of the particular microformats being used in a web page, then the web crawler can perform element extraction from the web page. However, there are many possible different microformats, and if the search engine 208 has to consider all of the possible microformats that might be used on a web page the process of analyzing the web page could be inefficient.

By the web server 106 informing the search engine 208 what microformats are in use in a particular web page or collection of web pages, the search engine 208 can efficiently look for content 110 that is described by those microformats. For example, the search engine 208 is aware that the web page uses an hCalender microformat somewhere on the web page, then the search engine 208 can scan the web page for content 110 that uses the hCalender microformat and process that portion of the web page accordingly. Thus, the web server 106 could inform the search engine 208 that web pages in a certain section of the web site support the hCalendar, hCard, or hReview formats. The web server 106 obtains the microformat information from an application program 108, in one embodiment.

Implicit System Configuration Information

System configuration information 120 can be implicit, based on information provided by the web server 106. For example, in one embodiment, the web server 106 returns only content 110 from a specific portion of a web page. The web server 106 might strip off template headers and footers prior to sending the web page. By knowing the content 110 of the specific portion, the search engine 208 is able to deduce the configuration of the web page by comparing the returned content 110 with a whole version of the web page. Thus, the information provided by the web server 106 is not explicitly system configuration information 120; however, such information may be deduced by the search engine 208 from the content 110.

Hardware Overview

Figure 4:
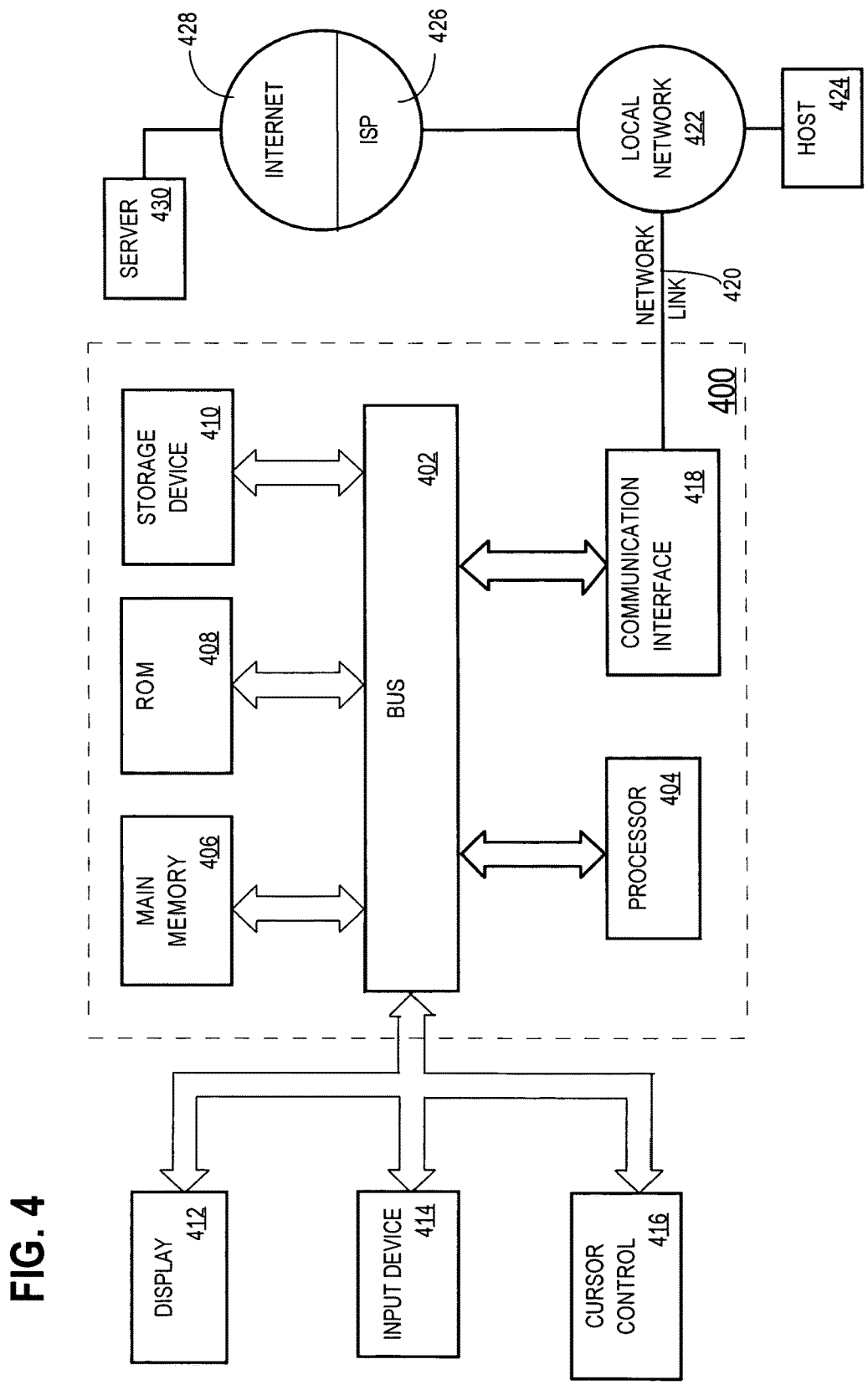
FIG. 4 is a block diagram that illustrates a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:

sending, by a search engine, to a first web server system that provides first web content, a first request for system configuration information that indicates hardware or software of the first web server system and that is separate from the first web content that is provided by the first web server system;

after sending the first request, receiving, by the search engine, as a response to the first request, first system configuration information that is of a first type;

wherein the first type is an information type in a particular group consisting of template information, session information, language-subsection information that indicates a first language of a first section of the first web content and a second language of a second section, of the first web content, that is different than the first section, identical content information, content interpretation information, microformat information that indicates a semantic meaning associated with (1) content on a first webpage hosted by the first web server system and (2) not content on a second webpage hosted by the first web server system, host information, error information, and application program information that indicates a first application program that is used for a third section of the first web content and a second application program that is used for a fourth section, of the first web content, that is different than the third section;

updating, by the search engine, based on the first system configuration information that is stored separate from a first index, the first index with at least a subset of the first web content;

in response to receiving, by the search engine, a first client request for content hosted on the first web server system, responding to the first client request by using the first index that has been updated based on the first system configuration information;

sending, by the search engine, to a second web server system that provides second web content and that is different than the first web server system, a second request for system configuration information that pertains to hardware or software associated with the second web server system and that is separate from the second web content that is provided by the second web server system;

after sending the second request, receiving, by the search engine, as a response to the second request, second system configuration information that is of a second type that is different than the first type and that is another type in the particular group; and updating, by the search engine, based on the second system configuration information, a second index with at least a subset of the second web content;

in response to receiving, by the search engine, a second client request for content hosted on the first web server system, responding to the second client request by using the second index that has been updated based on the second system configuration information;

wherein the steps are performed by one or more computing processors.

2. The method of claim 1, wherein the web content is organized in a directory and the first system configuration information pertaining to the web server system includes directory information.

3. The method of claim 1, wherein:

the first system configuration information includes (1) a first template that is applicable to a first set of web pages in the web content (2) a second template that is applicable to a second set of web pages in the web content;

the method further comprising using, by the search engine, the first template to determine a first format of the first set of web pages and the second template to determine a second format of the second set of web pages.

4. The method of claim 1, wherein:

the first system configuration information includes the session information, which is used by the web server system to manage sessions involving the web content;

the method further comprising using, by the search engine, the session information to avoid using URLs that include the session information.

5. The method of claim 1, wherein the first system configuration information identifies (1) the first language of the first section of the first webpage hosted by the first web server system, in which the first language is used; and (2) the second language of the second section of the first webpage hosted by the first web server system, in which the second language is used.

6. The method of claim 1, wherein:

the first system configuration information informs the search engine that two different paths of a web site hosted by the web server system contain identical content; and each path of said two different paths contains a directory that contains at least one file.

7. The method of claim 1, wherein the first system configuration information includes the content interpretation information.

8. The method of claim 1, wherein:

the first system configuration information identifies a plurality of microformats used on a web page that the first system configuration information specifies to indicate semantic meaning of elements on the web page;

the method further comprising using, by the search engine, each microformat of the plurality of microformats to extract different elements on the web page.

9. The method of claim 1, wherein:

the first system configuration information identifies a plurality of hosts that are served by the web server system;

each host of the plurality of hosts serves a different version of a web site hosted by the web server system.

10. The method of claim 1, wherein the first system configuration information includes contact information for an administrator of the web server system.

11. The method of claim 1, wherein:

the first system configuration information describes a response provided by the web server system when an error occurs;

the method further comprising using, by the search engine, the first system configuration information to improve soft-404 detection.

12. The method of claim 1, further comprising establishing a secure control channel, for receiving the first system configuration information, that is different than a channel through which the search engine receives web content from the web server system.

13. The method of claim 1, wherein the first system configuration information describes how the web server system organizes a particular type of web content.

14. The method of claim 1, wherein:

the first system configuration information identifies an application program that executes in the web server system to facilitate providing particular web content, and the first system configuration information identifies a web site path for which the application program is being used.

15. The method of claim 6, further comprising:

the search engine, in response to determining that said first system configuration information indicates that said two different paths contain identical content, web-crawling one of said two different paths but not the other of said two different paths.

16. A non-transitory computer-readable storage storing instructions which, when executed by one or more processors, cause:

sending, by a search engine, to a first web server system that provides first web content, a first request for system configuration information that indicates hardware or software of the first web server system and that is separate from the first web content that is provided by the first web server system;

after sending the first request, receiving, by the search engine, as a response to the first request, first system configuration information that is of a first type;

wherein the first type is an information type in a particular group consisting of template information, session information, language-sub section information that indicates a first language of a first section of the first web content and a second language of a second section, of the first web content, that is different than the first section, identical content information, content interpretation information, microformat information that indicates a semantic meaning associated with (1) content on a first webpage hosted by the first web server system and (2) not content on a second webpage hosted by the first web server system, host information, error information, and application program information that indicates a first application program that is used for a third section of the first web content and a second application program that is used for a fourth section, of the first web content, that is different than the third section;

updating, by the search engine, based on the first system configuration information that is stored separate from a first index, the first index with at least a subset of the first web content;

in response to receiving, by the search engine, a first client request for content hosted on the first web server system, responding to the first client request by using the first index that has been updated based on the first system configuration information;

sending, by the search engine, to a second web server system that provides second web content and that is different than the first web server system, a second request for system configuration information that pertains to hardware or software associated with the second web server system and that is separate from the second web content that is provided by the second web server system;

after sending the second request, receiving, by the search engine, as a response to the second request, second system configuration information that is of a second type that is different than the first type and that is another type in the particular group; and updating, by the search engine, based on the second system configuration information, a second index with at least a subset of the second web content;

in response to receiving, by the search engine, a second client request for content hosted on the first web server system, responding to the second client request by using the second index that has been updated based on the second system configuration information.

17. The non-transitory computer-readable storage of claim 16, wherein the web content is organized in a directory and the first system configuration information pertaining to the web server system includes directory information.

18. The non-transitory computer-readable storage of claim 16, wherein:
the first system configuration information includes (1) a first template that is applicable to a first set of web pages in the web content and (2) a second template that is applicable to a second set of web pages in the web content;
the instructions, when executed by the one or more processors, further cause using, by the search engine, the first template to determine a first format of the first set of web pages and the second template to determine a second format of the second set of web pages.

19. The non-transitory computer-readable storage of claim 16, wherein:
the first system configuration information includes the session information, which is used by the web server system to manage sessions involving the web content;
the instructions, when executed by the one or more processors, further cause using, by the search engine, the session information to avoid using URLs that include the session information.

20. The non-transitory computer-readable storage of claim 16, wherein the first system configuration information identifies (1) the first language of the first section of the first webpage hosted by the first web server system, in which the first language is used; and (2) the second language of the second section of the first webpage hosted by the first web server system, in which the second language is used.

21. The non-transitory computer-readable storage of claim 16, wherein:

the first system configuration information informs the search engine that two different paths of a web site hosted by the web server system only contain identical content; and each path of said two different paths contains a directory that contains at least one file; and the instructions, when executed by the one or more processors, further cause:
the search engine, in response to determining that said first system configuration information indicates that said two different paths only contain identical content, web-crawling one of said two different paths but not the other of said two different paths.

22. The non-transitory computer-readable storage of claim 16, wherein the first system configuration information includes the content interpretation information.

23. The non-transitory computer-readable storage of claim 16, wherein:
the first system configuration information identifies a plurality of microformats used on a web page to indicate semantic meaning of elements on the web page;
the instructions, when executed by the one or more processors, further cause using, by the search engine, each microformat of the plurality of microformats to extract different elements on the web page.

24. The non-transitory computer-readable storage of claim 16, wherein:
the first system configuration information identifies a plurality of hosts are served by the web server system;
each host of the plurality of hosts serves a different version of a web site hosted by the web server system.

25. The non-transitory computer-readable storage of claim 16, wherein the first system configuration information includes contact information for an administrator of the web server system.

26. The non-transitory computer-readable storage of claim 16, wherein:
the first system configuration information describes a response provided by the web server system when an error occurs;
the instructions, when executed by the one or more processors, further cause using, by the search engine, the system configuration information to improve soft-404 detection.

27. The non-transitory computer-readable storage of claim 16, further comprising establishing a secure control channel, for receiving the first system configuration information, that is different than a channel through which the search engine receives web content from the web server system.

28. The non-transitory computer-readable storage of claim 16, wherein the first system configuration information describes how the web server system organizes a particular type of web content.

29. The non-transitory computer-readable storage of claim 16, wherein:
the first system configuration information identifies an application program that executes in the web server system to facilitate providing content, and
the first system configuration information identifies a web site path for which the application program is being used.

* * * * *